United States Patent
Kang

(10) Patent No.: US 10,343,346 B2
(45) Date of Patent: Jul. 9, 2019

(54) MULTIPURPOSE SPATULA

(71) Applicant: Soungjo Kang, Incheon (KR)

(72) Inventor: Soungjo Kang, Incheon (KR)

( * ) Notice: Subject to any disclaimer, the term of this patent is extended or adjusted under 35 U.S.C. 154(b) by 0 days.

(21) Appl. No.: 15/738,106

(22) PCT Filed: Jun. 23, 2016

(86) PCT No.: PCT/KR2016/006699
§ 371 (c)(1),
(2) Date: Dec. 19, 2017

(87) PCT Pub. No.: WO2016/209000
PCT Pub. Date: Dec. 29, 2016

(65) Prior Publication Data
US 2018/0304545 A1    Oct. 25, 2018

(30) Foreign Application Priority Data

Jun. 26, 2015 (KR) .................. 10-2015-0090853

(51) Int. Cl.
| B29C 65/00 | (2006.01) |
| A47J 43/28 | (2006.01) |
| B29L 31/00 | (2006.01) |
| G09F 7/12  | (2006.01) |

(52) U.S. Cl.
CPC ............ *B29C 66/47* (2013.01); *A47J 43/288* (2013.01); *B29C 66/006* (2013.01); *B29C 66/45* (2013.01); *B29C 66/8122* (2013.01); *B29C 66/8124* (2013.01); *B29C 66/82261* (2013.01); *B29L 2031/7232* (2013.01); *G09F 7/12* (2013.01)

(58) Field of Classification Search
CPC . B29L 2031/7232; G09F 7/12; B29C 66/006; B29C 66/45; B29C 66/8122; B29C 66/82261
USPC ........................................ 156/580, 60, 502
See application file for complete search history.

(56) References Cited

FOREIGN PATENT DOCUMENTS

| JP | 2002-219433 A  | 8/2002  |
| JP | 2015-104866 A  | 6/2015  |
| KR | 20-0253961 Y1  | 11/2001 |
| KR | 20-0325577 Y1  | 9/2003  |
| KR | 20-0437027 Y1  | 10/2007 |

OTHER PUBLICATIONS

3M Dry Applicator Core Sleeve (Sleeve), Anti-scratch Cover, Explanation of Products, Feb. 2012, http://www.silre.com/shop/prd_view.php?prdcode=1312260001&catcode=&page=1. English machine translation provided.

*Primary Examiner* — Mark A Osele
*Assistant Examiner* — Nickolas R Harm
(74) *Attorney, Agent, or Firm* — Im IP Law; C. Andrew Im; Chai Im

(57) ABSTRACT

A multipurpose spatula which has a separable pressing member on the outer surface of a body thereof. The pressing member is rotatable as required to allow a side surface thereof to be located on the end of one side pressing piece. This minimizes the occurrence of scratches on sheets attached to advertising signs and tables, etc. and also promotes user conveniences.

1 Claim, 3 Drawing Sheets

MULTIPURPOSE SPATULA

RELATED APPLICATIONS

This application is a § 371 application from PCT/KR2016/006699 filed Jun. 23, 2016, which claims priority from Korean Patent Application No. 10-2015-0090853 filed Jun. 26, 2015, each of which is incorporated herein by reference in its entirety.

TECHNICAL FIELD

The present invention relates to a multipurpose spatula, and more particularly, to a multipurpose spatula that is improved in configuration to reduce the occurrence of scratches on sheets attached to advertising signs and tables, etc. and also to promote user conveniences.

BACKGROUND ART

As shown in FIG. 4, one of conventional spatulas is disclosed in Korean Utility Model Registration No. 20-0325577 entitled "advertising sign sheet attaching spatula with cap", wherein the conventional spatula, which has a cylindrical body having a mounting groove formed on one side thereof in a longitudinal direction, a mounting part located on one side of the body in such a manner as to be coupled to the mounting groove of the body, and a pressing member located on the other side of the mounting part in such a manner as to have an inverted triangular section, includes insertion parts inserted into both ends of the body and caps connected to one side of the insertion parts and having disc-shaped locking protrusions having large outer diameters than the outer diameters of the insertion parts.

After a sheet is located on one side surface or both side surfaces of an advertising sign, like this, the body of the conventional spatula is taken by a user, and the pressing member is pressed against the surface of the sheet to attach the sheet to the surface of the advertising sign. If foreign substances like sand, dust, and so on exist on the sheet or advertising sign, in this process, they are pressed on the sheet as well as the pressing member, so that the end portion of the pressing member may be damaged to cause difficulties in attachment of another sheet to the advertising sign. So as to use the pressing member again, in this case, the damaged portion of the pressing member is polished by sandpaper or stone, which undesirably causes inconveniences of use.

So as to remove the above-mentioned problems, accordingly, the pressing member is made of hard silicone, urethane, a steel plate, and so on, but in this case, dust or foreign substances existing on the pressing member may be pressed on the surface of the sheet due to the material characteristics of the pressing member, thereby undesirably causing many scratches on the surface of the sheet.

OBJECT AND SUMMARY OF THE INVENTION

Technical Problem

Accordingly, the present invention has been made in view of the above-mentioned problems occurring in the prior art, and it is an object of the present invention to provide a multipurpose spatula that has a pressing member separable from the outer surface of a body thereof, so that if necessary, the pressing member rotates to allow the other side surface thereof to be located on the end portion of one side pressing piece, thereby minimizing the occurrence of scratches on sheets attached to advertising signs and tables, etc. and also promoting user conveniences.

Technical Solution

To accomplish the above-mentioned object, according to the present invention, there is provided a multipurpose spatula including: a body having pressing pieces formed on both sides thereof; a pressing member separably coupled to the body; and a rotation part rotatably disposed on the body to induce rotation of the pressing member.

Advantageous Effects

According to the present invention, the multipurpose spatula has the pressing member separable from the outer surface of the body thereof, so that if necessary, the pressing member rotates to allow the other side surface thereof to be located on the end portion of one side pressing piece, thereby minimizing the occurrence of scratches when sheets are attached to advertising signs and tables, during wallpapering, and during interior accessory attaching, and also promoting user conveniences.

DETAILED DESCRIPTION OF THE EMBODIMENTS

Hereinafter, an explanation on a multipurpose spatula according to the present invention will be in detail given with reference to the attached drawing.

In the description, if it is determined that the detailed explanation on the well-known technology related to the present invention makes the scope of the present invention not clear, the explanation will be avoided for the brevity of the description and to allow the scope of the invention to be more obvious.

Figure 1:
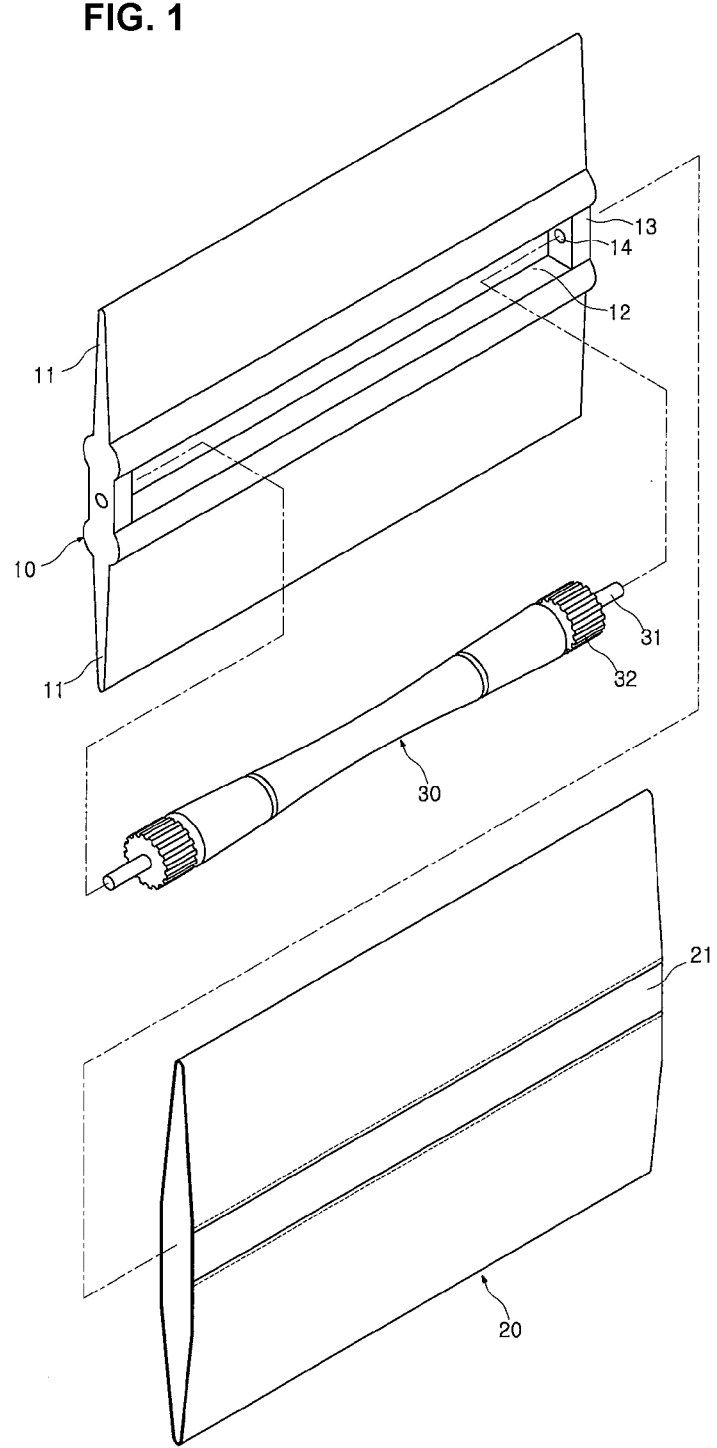
FIG. 1 is an exploded perspective view showing a multipurpose spatula according to the present invention.
Figure 2:
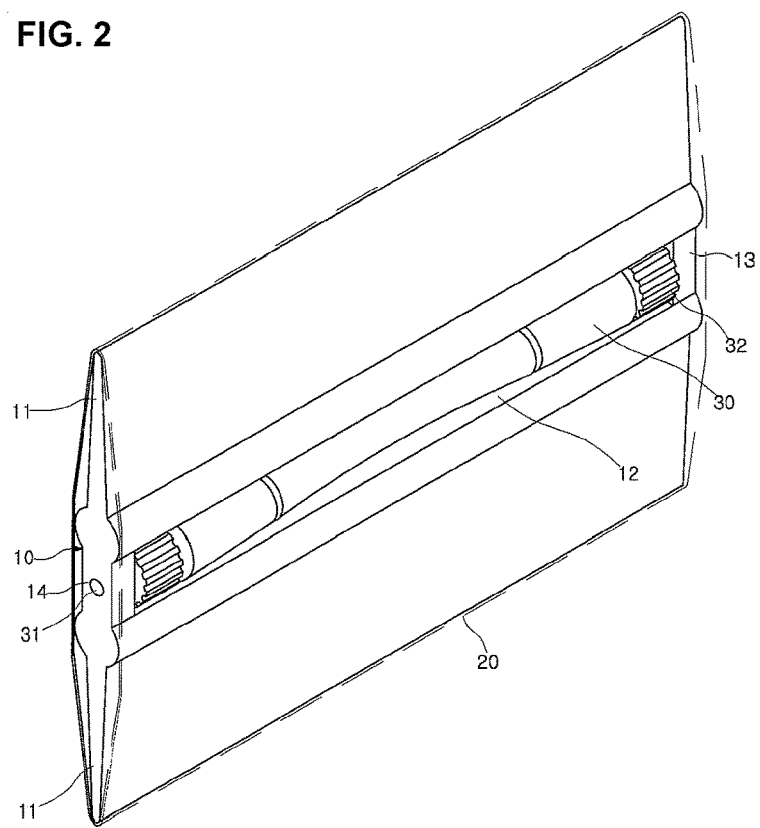
FIG. 2 is a perspective view showing the multipurpose spatula according to the present invention.
Figure 3:
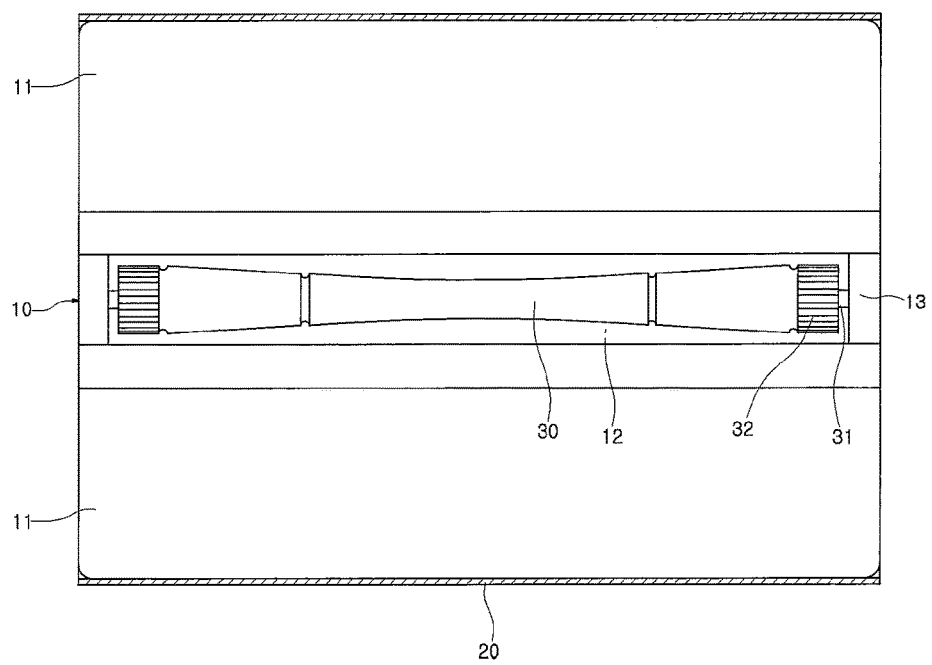
FIG. 3 is a sectional view showing the multipurpose spatula according to the present invention.
Figure 4:
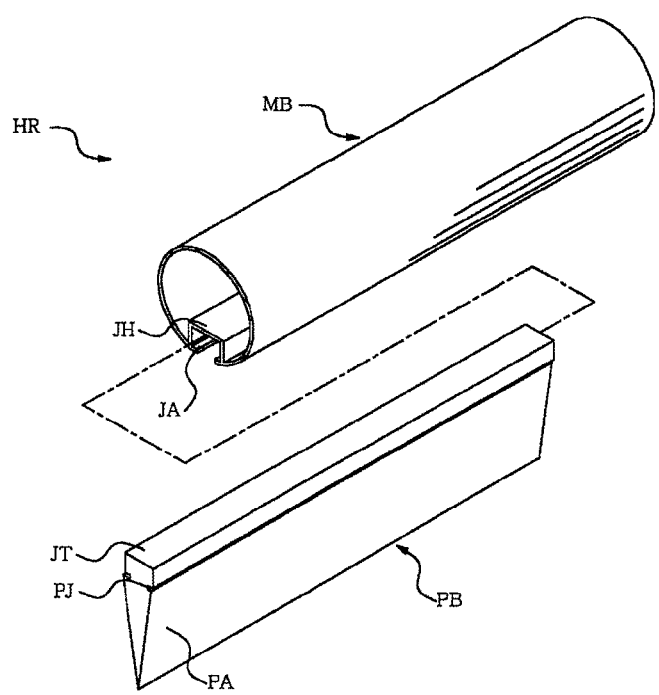
FIG. 4 is a perspective view showing a conventional advertising sign sheet attaching spatula with caps.

As shown in FIGS. 1 to 3, a multipurpose spatula according to the present invention includes a body 10 having pressing pieces 11 formed on both sides thereof, a pressing member 20 separably coupled to the body 10, and a rotation part 30 rotatably disposed on the body 10 to induce rotation of the pressing member 20.

The body 10 has the pressing pieces 11 formed protrudingly from both sides thereof, a mounting hole 12 formed on the center thereof in a longitudinal direction thereof, and support pieces 13 disposed on both sides of the mounting hole 12.

The pressing pieces 11 are desirably narrow in width as they go toward the ends thereof from the mounting hole 12.

The support pieces 13 have fitting holes 14 formed thereon to rotatably insert hinge pieces 31 of the rotation part 30 as will be discussed later thereinto.

The pressing member 20 is made of any one of a cloth, a woven fabric, a fiber fabric, a non-woven fabric, and a linen fabric, and of course, it may be made of various materials, without being limited particularly thereto.

Further, the pressing member 20 includes an elastic member 21 fitted to the body 10 to maintain a state of tension.

The rotation part 30 has the hinge pieces 31 fitted to the fitting holes 14 of the body 10 and rotation inducing pieces 32 disposed on both sides thereof.

The rotation inducing pieces 32 are disposed to a concave-convex shape along the outer peripheral surfaces of both sides of the rotation part 30.

Now, an explanation on the operation of the multipurpose spatula according to the present invention will be given. After the hinge pieces 31 of the rotation part 30 are fitted to the fitting holes 14 of the body 10, the rotation part 30 is rotatably located within the mounting hole 12 of the body 10. Next, the pressing member 20 is fitted to the pressing pieces 11 of the body 10.

So as to attach a sheet to an advertising sign, for example, the sheet is located on the advertising sign, and next, the pressing member 20 located on the pressing pieces 11 is pressurized in the state of taking the multipurpose spatula according to the present invention by a user.

If the pressing member 20 is worn out in the use process of the multipurpose spatula, the pressing member 20 and the rotation part 30 are at the same time pressed to rotate the rotation part 30 to one direction, so that the hinge pieces 31 of the rotation part 30 rotate along the fitting holes 14 of the body 10 to allow the other side surface of the pressing member 20 to be located on one side pressing piece 11, thereby improving the user conveniences.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A multipurpose spatula, comprising:
   a body having pressing pieces formed on both sides of the body, a mounting hole formed on a center of the body in a longitudinal direction and support pieces disposed on both sides of the mounting hole, each support piece comprising a fitting hole;
   a pressing member separably coupled to the body;
   a rotation part rotatably disposed in the mounting hole of the body to induce a rotation of the pressing member and having rotation inducing pieces disposed along outer peripheral surfaces of both sides of the rotation part, the rotation part comprising a hinge, at each end of the rotation part, removably insertable into a corresponding fitting hole; and
   wherein the pressing member is made of any one of a cloth, a woven fabric, a fiber fabric, a non-woven fabric, and a linen fabric, and the pressing member comprises an elastic member configured to elastically support the pressing pieces of the body thereagainst, and the rotation inducing pieces have a concave-convex shape.

* * * * *